United States Patent [19]

Shimizu

[11] Patent Number: 4,491,142

[45] Date of Patent: Jan. 1, 1985

[54] AUTOMATIC STOPPING DEVICE OF COMBUSTION FUEL SUPPLY

[75] Inventor: Kunio Shimizu, Tokyo, Japan

[73] Assignee: Touto Denki Kabushiki Kaisha, Tokyo, Japan

[21] Appl. No.: 418,513

[22] Filed: Sep. 14, 1982

[30] Foreign Application Priority Data

Jun. 15, 1982 [JP] Japan .................. 57-103298

[51] Int. Cl.³ .............. F23D 13/46; F16K 31/08; F23N 5/08
[52] U.S. Cl. ........................... 137/65; 137/66; 250/554; 251/65; 431/79
[58] Field of Search .......... 137/65, 66; 250/554, 250/557; 431/79; 251/65; 236/15 BB

[56] References Cited

U.S. PATENT DOCUMENTS

| | | | |
|---|---|---|---|
| 2,388,124 | 10/1945 | Crews | 250/554 |
| 2,408,954 | 10/1946 | Ray | 137/65 |
| 2,418,845 | 4/1947 | Long | 250/554 |
| 2,446,718 | 8/1948 | Ray | 250/554 |
| 2,586,249 | 2/1952 | Paille | 137/66 |
| 2,589,573 | 3/1952 | Ray | 137/66 |
| 3,220,463 | 11/1965 | Hocking et al. | 137/65 |

FOREIGN PATENT DOCUMENTS

56-20883  2/1981  Japan .................. 251/65

Primary Examiner—George L. Walton

[57] ABSTRACT

An automatic fuel supply stopping device incorporated in fuel combustion equipment including a shut-off valve and a combustor. The automatic fuel supply stopping device comprises a fluid intercepting mechanism interposed in a channel through which the fuel supply to the combustor is supplied. A photosensor is adapted to detect fuel combustion in the combustor by radiation emitted from a thermosensitive luminous medium. The fluid intercepting mechanism alternately takes its first stable state or passage blocking state and is changed over, in response to an output from a sensor circuit, from the passage opening state to the passage blocking state.

1 Claim, 14 Drawing Figures

AUTOMATIC STOPPING DEVICE OF COMBUSTION FUEL SUPPLY

BACKGROUND OF THE INVENTION

The present invention relates to an automatic fuel supply stopping device to be incorporated in a combustion equipment such as a gas heater into which fluid fuel is steadily supplied to be ignited and maintained burning.

The combustion equipments using town gas have usually often employed, as gas leakage preventing devices, so-called automatic safety devices, the thermoresponsive devices as of bimetal. Such thermo-responsive device of prior art comprises a fluid intercepting mechanism interposed in a channel for gas supply to a combustor and this thermoresponsive device is normally heated by a part of combustion heat produced from the combustor. During combustion, the device is actuated to hold said fluid intercepting mechanism in the passage opening state (i.e., the state in which a gas stream steadily flows through the gas pipe and maintains the combustion). Upon disappearance of gas flame due some causes, said thermo-responsive device is cooled and the fluid intercepting mechanism is automatically changed over to the passage blocking state (the state in which the gas stream flowing through the gas pipe is blocked) and held in such state. In such termoresponsive device of prior art utilizing bimetal or like, the fluid intercepting mechanism can not be perfectly driven to its passage blocking state unless said thermoresponsive device is sufficiently cooled and, in consequence, a plenty of gas still supplied often leaks into the exterior during a period from extinction of the gas flame to actuation of the fluid intercepting mechanism. This has often caused gas-poisoning and gas-explosion.

OBJECT OF THE INVENTION

Object of the present invention is to provide an automatic fuel supply stopping device adapted to be actuated immediately upon extinction of the flame in the combustor, to stop supply of fuel such as town gas for prevention of fuel leakage.

BRIEF DESCRIPTION OF THE DRAWING

FIGS. 2(a), (b) is a perspective view showing important parts of the automatic fuel supply stopping device according to the present invention;

FIGS. 5(a), (b) show a state of said combustion equipment in the vicinity of a manual operating knob, in which

FIGS. 6(a), (b) are sectional views respectively showing another state of the part shown in FIGS. 5(a), (b), in which

DETAILED DESCRIPTION OF THE INVENTION

Figure 1:
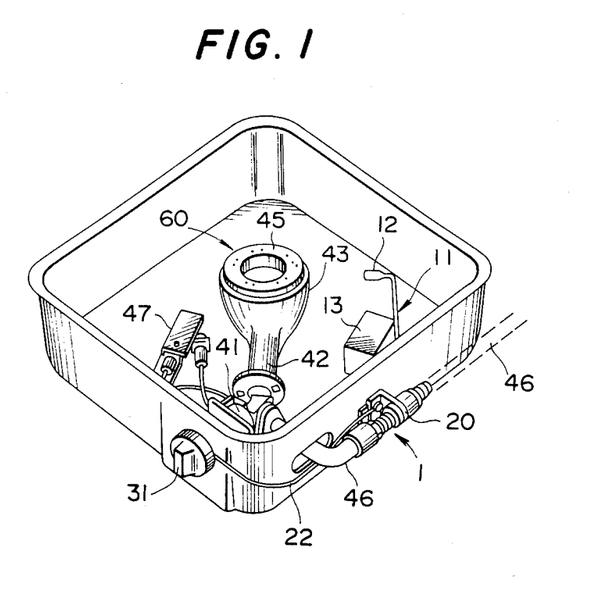
FIG. 1 is a perspective view showing by way of example a combustion equipment provided with the automatic fuel supply stopping device according to the present invention.

FIG. 1 is a perspective view showing an external appearance of the gas heater provided with an automatic stopping device according to the present invention. The gas heater shown includes a shut-off valve 41 adapted to be opened and closed to control gas supply, and a combustor 60 as a unit consuming a quantity of gas supplied through said valve 41. There is provided a knob 31 serving as manual control means by which said valve 41 is opened and closed. When the valve 41 is opened by manipulating said knob 31, a piezo-electric ignition system is actuated and an ignition spark is produced from an ignition electrodes 47 thereof. In a gas supplying channel leading to said combustor 60, there is further inserted a fuid intercepting mechanism 1 separately of said valve 41.

Figures 2A, 2B:
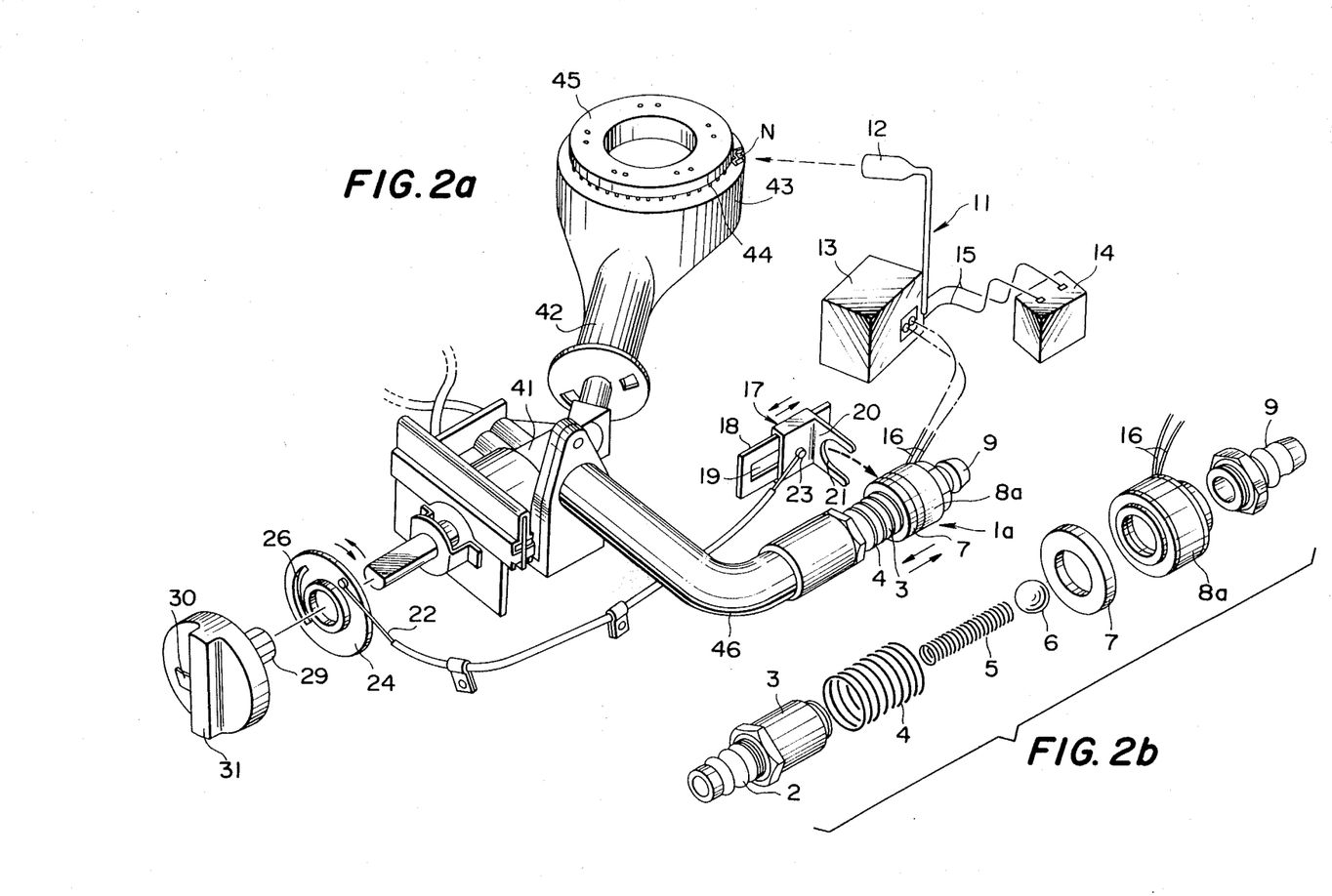

FIG. 2(a) is a perspective view showing important components of the gas heater shown by FIG. 1, as individually developed. Said fluid intercepting mechanism 1 alternately takes two stable states, i.e., the state at which the mechanism 1 leaves the passage open and the state at which the mechanism 1 shuts said passage. Change-over of this fluid intercepting mechanism 1 between said two stable states is controled by a light receiving/energizing mechanism 11 which functions as a detecting unit for a current state of combustion. The fluid intercepting mechanism 1 is adapted also to be driven to the passage opening state as said valve 41 is opened.

Preferred embodiments of the present invention will be described in reference with the accompanying drawing more in detail.

Reference numeral 1 generally designates the fluid intercepting mechanism. A first embodiment 1a of this fluid intercepting mechanism includes a tubular casing 3 which is, in turn, provided with opposite open ends 9, 2 serving as inlet and outlet of fuel. The tubular casing 3 has therein a valve chest 10 and a valve seat 10' successively in the direction of flowing. The valve chest 10 contains a valve body 6 made of soft magnetic material in a floating state. There is provided resilient biasing means 5 normally biasing this valve body 6 to be disengaged from the valve seat 10' and thereby to open the passage. This resilient biasing means 5 comprises, in the embodiment, a coil spring. To bias said valve body 6, on the contrary, to be held in engagement with said valve seat 10' against the force of said resilient biasing means 5 and thereby to intercept the passage, there is provided a permanent magnet 7 of which the magnetic effect produces the desired biasing force. The permanent magnet 7 is annular and so loosely mounted around the periphery of said casing 3 that the annular permanent magnet 7 is axially movable with respect to the casing 3. This permanent magnet 7 is held by a spring 4 on a position at which said valve body 6 is subjected to the strongest magnetic attraction of the magnet 7. Specifically, the permanent magnet 7 is resiliently biased towards a position the most adjacent to the valve body 6 and prevented, at this position, by exciting means 8a or a projection 3' from being further moved rearwards (i.e., rightwards as seen in figures). As will be described later more in detail, the exciting means 8a is stationarily mounted around the outer periphery of the casing 3, in which the valve chest 10 is formed, and opposed to the permanent magnet 7. When the permanent magnet 7 is held at the position most closely adjacent to the valve body 6, the magnetic effect of the permanent magnet 7 overcomes the compressive force of the resilient biasing means 5 so that the valve body 6 immediately rests on the valve seat 10' and is stabilized to shut the passage off (see FIG. 3(a)). When the permanent magnet 7 leaves the valve body 6, the compressive force of the resilient biasing means 5 becomes superior to the magnetic effect of the permanent magnet 7, resulting in that the valve body 6 is floated in the valve chest 10 apart the valve seat 10' and stabilized to open the passage (see FIG. 3(b)). The latter operation occurs under the magnetic effect of the exciting means 8a. Specifically, this exciting means 8a comprises electromagnetic means such as a solenoid. When the winding of said exciting means 8a is energized, the permanent magnet 7 is separated from the exciting means 8a confronting said permanent magnet 7 under a repulsive magnetic force generated from said exciting means 8a. The permanent magnet 7 is maintained thus separated from the exciting means 8a so long as said winding is energized. Thus, the fluid intercepting mechanism 1a is kept in its second stable state (i.e., the passage opening state). As soon as the exciting means 8a is deenergized, said repulsive magnetic force of the exciting means 8a disappears and the permanent magnet 7 is resiliently biased again to approach the valve body 6. When the permanent magnet 7 becomes stationary at the position closely adjacent the valve body 6, the fluid intercepting mechanism 1a is brought again to the first stable state (i.e., the passage intercepting state).

Energization of the exciting means 8a to generate said repulsive magnetic force is performed by the light receiving/energizing mechanism 11 comprising a light sensor 12 and a sensor circuit 13. In this manner, a cooperation of the resilient biasing means 5 and the permanent magnet 7 provides the first stable state in which the force of the resilient biasing means 5 is sufficiently overcome to make said valve body 6 rest on said valve seat 10' and thereby to intercept the passage (see FIG. 3(a)) and the second stable state in which the force of said resilient biasing means 5 sufficiently overcomes the magnetic effect of said permanent magnet 7 to separate said valve body 6 from said valve seat 10' and thereby to open the passage (see FIG. 3(b)). Change-over between the first stable state (i.e., the passage intercepting state) and the second stable state (i.e., the passage opening state) is achieved by axial displacement of the permanent magnet 7 relative to the casing 3 so as to approach or recede from the valve body 6.

The permanent magnet 7 is resiliently biased by the spring 4 towards the position as adjacent as possible to the valve body 6 and then held there stationary to maintain the fluid intercepting mechanism 1a in its first stable state (i.e., the passage intercepting state). To bring the fluid intercepting mechanism 1a to its first stable state (i.e., the passage opening state), the permanent magnet 7 must be exposed to a force which is superior and of direction opposed to said compressive force of the spring 4.

The light receiving/energizing mechanism 11 comprises the light sensor 12 and the sensor circuit 13. The light sensor 12 may be a photoelectric converter such as a phototransistor usually utilized primarily for detection of ultrared rays. The sensor circuit 13 may be the current control circuit of well known art adapted to energize the exciting means 8 of said fluid intercepting mechanism 1 through a battery 14 in response to the photo-signals received by the light sensor 12. More specifically, such light receiving/energizing mechanism 11 so functions that the light thermosensitively emitted from a thermosensitive luminous medium (N) mounted on a burner head 43 of the gas heater in the vicinity of a nozzle 44 is detected by the photo-sensor 12 and the corresponding detection signals are transmitted through the sensor circuit 13 to the winding of the exciting means 8a belonging to the fluid intercepting mechanism 1.

Figure 4:
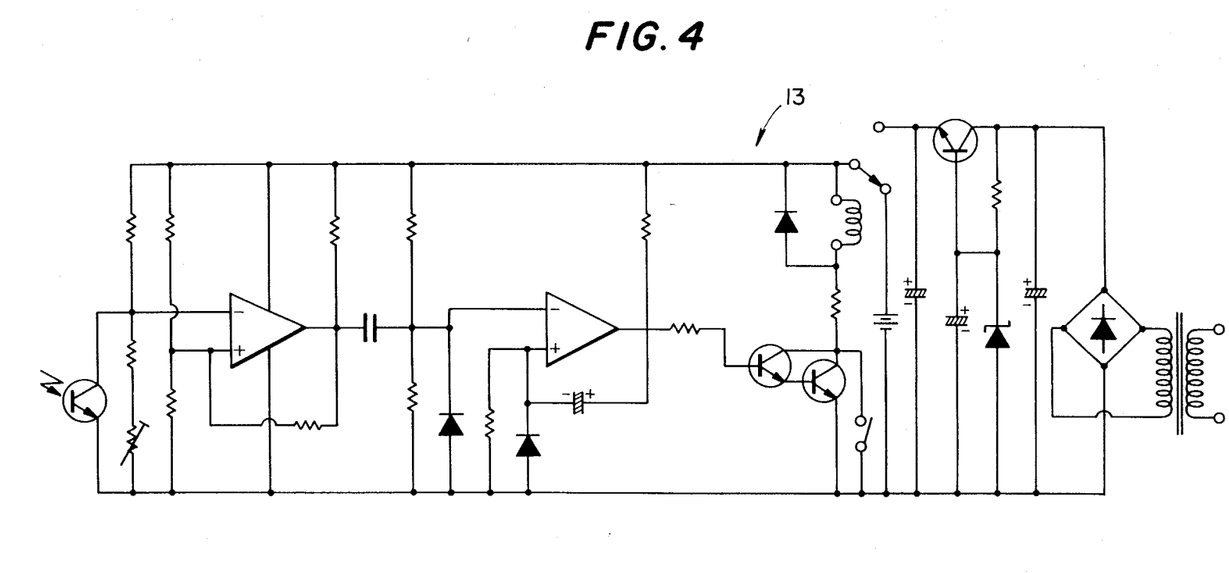
FIG. 4 is a circuit diagram illustrating a current control circuit included in a light receiving/energizing mechanism.

FIG. 4 is a circuit diagram of the sensor circuit used in the light receiving/energizing mechanism. As this sensor circuit 13, GAS-003 (A-D) sensor is employed by this embodiment. However, the sensor circuit 13 is never limited to such particular circuit and may be those usually utilized such as the relay of one-shot multivibrator type. In other words, the sensor circuit 13 may be of any arrangement, so far as it permits the exciting means 8a of the fluid intercepting mechanism 1. As the thermosensitive luminous medium (N), a thermal conductor plate is employed, which comprises nichrome wire, copper wire, iron wire or like flattened into a plate. Such thermosensitive luminous medium (N) comprising any one of these thermal conductor plates is employed to enhance the performance of the light sensor 12. Namely, the flame burning from the nozzle 44 of the burner head 43 is thermally conducted to said thermosensitive luminous medium (N) and thereby a constant thermal radiation is maintained so that the photosensor 12 of the light receiving/energizing mechanism 11 may be exposed to such constant thermal radiation.

A series of experimental studies have shown that the problems encountered by the usual arrangement in which the luminous flame developed from the nozzle 44 of the burner head 43 is directly photosensed by the photo-sensor 12, for example, instability of the flame luminance, poor sensitivity of the photo-sensor 12 as well as non-response of the light receiving/energizing mechanism 1 particularly when the flame is small are effectively overcome by the arrangement according to the present invention. Result of this expements is shown in the following table. In these experiments, a commercially available phototransistor as the photo-senser, Model 127580 manufactured by Fukuda Metalworking Industries Co., Ltd. as the gas heater, and Toshiba P1—1 photoelectric illuminometer as the measuring instrument were employed, respectively. Used gas was 5,000 Kcal. 6B.

| Material | Distance from flame (mm) | Luminance (lux) | Flam height (cm) | Response time (sec) |
|---|---|---|---|---|
| (1) Flame only | 150 | 3.0 | 7 | 1.2 |
| | | 2.0 | 5 | 2.0 |
| | | 0.3 | 4 | (no response) |
| (2) Nichrome wire (plate) | 150 | 10.5 | 7 | 0.75 |
| | | 9.0 | 5 | 0.8 |
| | | 8.3 | 3 | 0.42 |
| | | 7.0 | 0.5 | 1.0 |
| (3) Nichrome wire (coil) | 150 | 8.5 | 7 | 0.81 |
| | | 7.6 | 5 | 0.98 |
| | | 6.8 | 3 | 1.3 |
| | | 4.0 | 0.5 | 1.52 |
| (4) Copper | 150 | 7.4 | 7 | 2.6 |

-continued

| Material | Distance from flame (mm) | Luminance (lux) | Flame height (cm) | Response time (sec) |
|---|---|---|---|---|
| wire (coil) | | | | (burned after single response) |
| (5) Iron wire (coil) | 150 | 6.5 | 7 | 3.22 |

It has been found from the experimental result as listed above that the nichrome were flattened into a plate is most preferable as the thermosensitive luminous medium (N).

So long as combustion lasts in the combustor, the light receiving/energizing mechanism 11 continues to energize the exciting means 8a which functions then to hold the fluid intercepting mechanism 1a in its second stable state (i.e., the passage opening state) under the repulsive magnetic force developed from said exciting means, but when the combustion flame disappears (the state of gas leakage) due to some causes, energization of the exciting means 8a from the light receiving/energizing mechanism 1a is stopped and, inconsequence, said repulsive magnetic force also disappears, resulting in that the fluid intercepting mechanism 1a is changed over to its first stable state (i.e., the passage intercepting state) to intercept supply of fuel (gas).

Figure 3A:
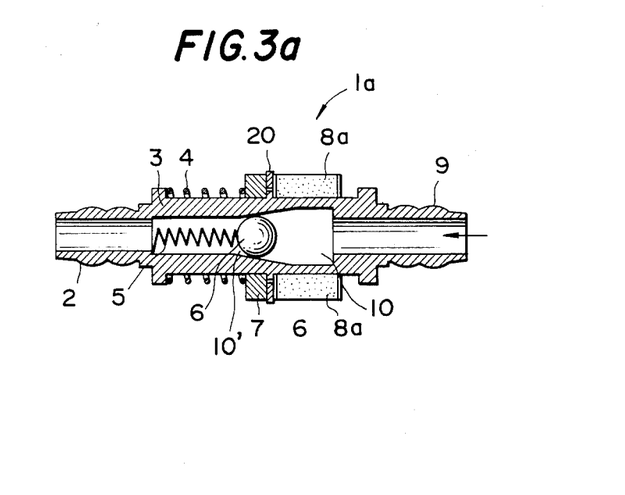
FIGS. 3(a), (b) are sectional views respectively showing the manner in which a fluid intercepting mechanism used in said automatic fuel supply stopping device functions.
Figure 3B:
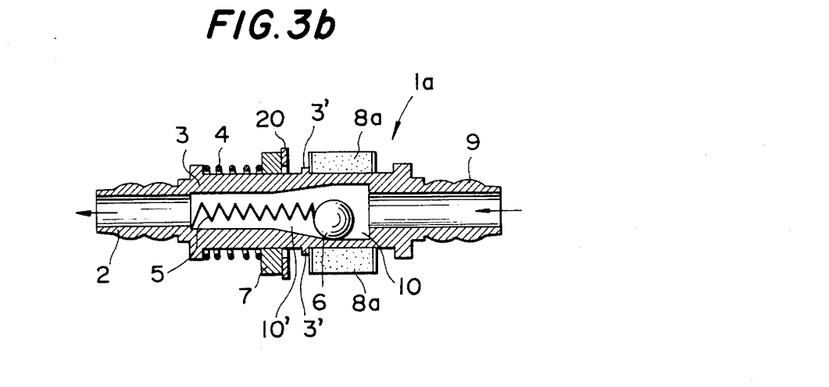

From this first stable state, the fluid intercepting mechanism 1a is driven by a permanent magnet manipulating mechanism 17 again to the passage opening state. More specifically, a slider menber 20 is slidable in the direction of an arrow along a guide plate 18 mounted on the combustor itself. As seen in FIGS. 2(a), 3(a), (b) this slider member 20 is interposed between the permanent magnet 7 and the exciting means 8a, and normally biased under the resilient force of the spring to approach together with the permanent magnet 7 the valve body 6. To changeover the fluid intercepting mechanism 1a from the first stable state or the passage intercepting state to the second stable state or the passage opening state, said slider member 18 may be forcibly moved against the resilient force of said spring 4 by pushing said permanent magnet 7 forwards. Said permanent magnet manipulating mechanism 17 is operatively associated with a manually operating knob 31 to achieve said forcible movement of the permanent magnet 7.

Figure 5A:
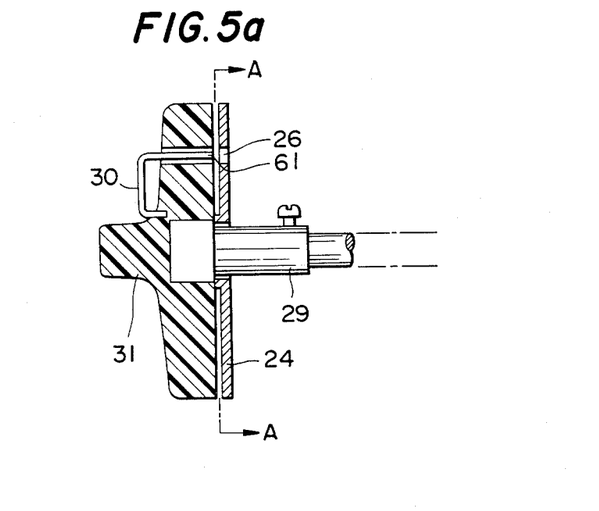
FIG. 5(a) is a section taken through the knob and FIG. 5(b) is a section taken along a line A—A in FIG. 5(a) showing the manner in which the knob is coupled to the fluid intercepting mechanism.
Figure 5B:
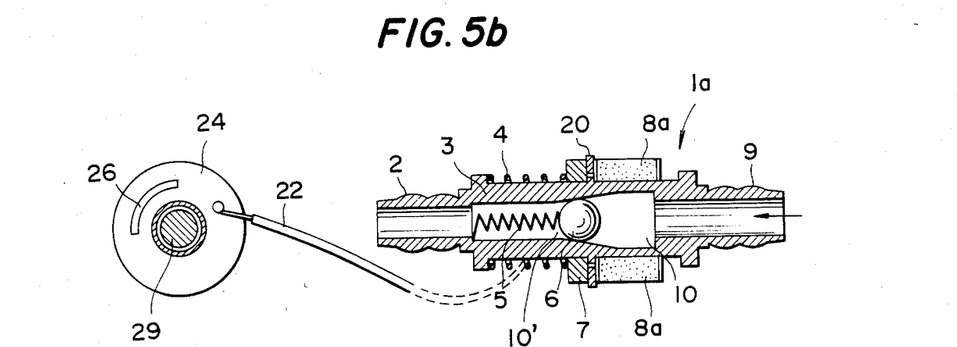
Figure 6A:
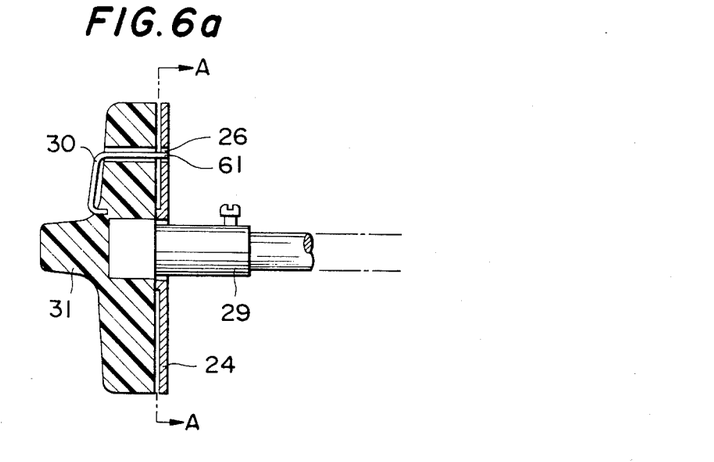
FIG. 6(a) is a section taken along the same plane as in FIG. 5(b)
Figure 6B:
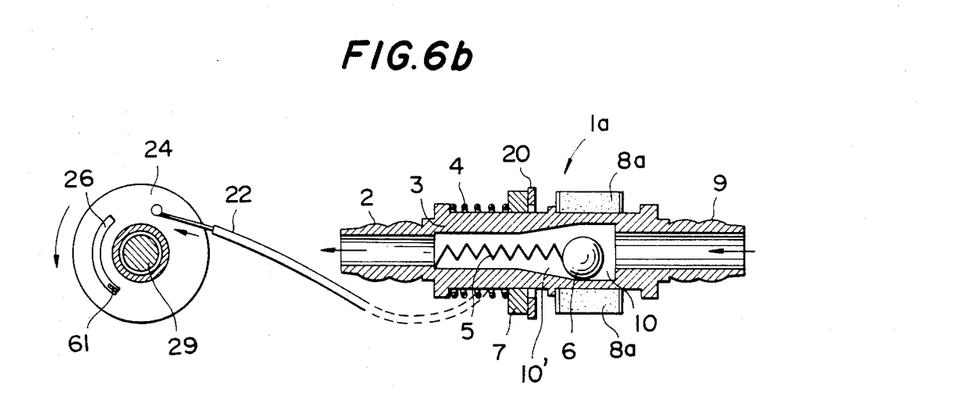

There is provided adjacent said manually operating knob 31 a disc-like actuator 24 adapted to be disengageably coupled to said manually operating knob 31. The manually operating knob 31 is provided with coupling control means 30 which may be simultaneously operated when the knob 31 is operated and thereby these two components may be automatically coupled to each other. FIG. 5(a), (b) and FIG. 6(a), (b) illustrate, in detail, the manner in which said actuator 24 is coupled to said manually operating knob 31. Referring to FIG. 5(a), (b), first, said coupling control means 30 laterally projects from a front side of said knob 31. This coupling control means 30 comprises a reed-like leaf spring bent in hook-shape of which one end is secured to the knob 31 and the other end extends to the rear surface of the knob 31 as a free end. Said actuator 24 is rotatably and loosely mounted on the outer periphery of a rotary shaft 29 for said knob 31 and provided in the planar portion thereof with a circular slit 26 and a wire 22 constituting a part of a transmission mechanism is secured at one end to this actuator 24. When said manually operating knob 31 is operated with fingers, these fingers (not shown) partially come into contact with said coupling control means 30 which then correspondingly forced as seen in FIG. 5(b). Thereupon, the free end 61 of the coupling control means 30 projects from the rear surface of the knob 31 and engages into the slit 21 of said actuator 24 so that the manually operating knob 31 is coupled to the actuator 24. Rotation of the manually operating knob 31 from this state counterclockwise as seen in FIG. 5(b) to open said valve 41 causes said actuator 24 also to be rotated counterclockwise and this rotation is transmitted by said wire 22 to said slider member 20, as seen in FIG. 6(b). In consequence, the slider member 20 urges said permanent magnet 7 against the resilient force of said spring 4 and thereby drives said fluid intercepting mechanism 1a from the first stable state or the passage intercepting state to the second stable state or the passage opening state. When the fingers leave said manually operating knob 31, said coupling control means 30 returns to its initial state shown by FIG. 5(a) and, as a result, the actuator 24 is disengaged from the manually operating knob 31. The actuator 24 and the slider member 20 thereby restore their initial states under the resilient force of the spring 4 belonging to the fluid intercepting mechanism.

As the valve 41 is opened by rotation of the manually operating knob 31 in the above-mentioned manner, said fluid intercepting mechanism 1a is automatically set to the passage opening state and the combustor is automatically supplied with fuel or gas.

Now the manner in which the device according to the present invention is used will be described. After the device according to the present invention has been set into the gas heater itself, as seen in FIG. 1, gas supply through a gas pipe 46 is started (the main stopcock for gas supply is opened). In this state, the valve body 6 is held resting on the valve seat 10' under the magnetic force of the permanent magnet 7 so that the fluid intercepting mechanism 1a is in its first stable state (i.e., the passage intercepting state) and thereby gas supply is perfectly intercepted.

Upon turning the knob 31, the actuator 24 causes the permanent magnet 7 to be separated from the exciting means 8a under the action of the slider member 20. The permanent magnet 7 thereby recedes from the valve body 6 which, in turn, drifts apart from the valve seat 10'. Thus, the fluid intercepting mechanism 1a is changed over to its second stable state in which the valve body 6 floats within the valve chest 10 and the stream of gas is allowed to flow into the gas pipe 46 (see FIG. 6(b)). Simultaneously with this supplying of gas, the gas stream flows through the burner head 43 of the gas heater itself and the quantity of gas continuously discharged through the nozzle 44 is ignited. At the moment of ignition, the thermosensitive luminous medium (N) thermosensitively emits a radiation which is, in turn, detected by the photo-sensor 12 and the corresponding detection signals are transmitted through the sensor circuit to the exciting means 8a to energize the latter. The permanent magnet 7 is then placed under the repulsive magnetic force of the exciting means 8a and thereby the fluid intercepting mechanism 1a is held in the second stable state (i.e., the passage opening state).

When the flame disappears from the nozzle due to some causes (the state of gas leakage), the radiation emitted from the thermosensitive luminous medium (N) also disappears and, at the same time, the photo-sensor 12 is correspondingly actuated and energization of the exciting means 8a through the sensor circuit 13 is stopped. As a result, the magnetic effect of the exciting means 8a disappears and the permanent magnet 7 is resiliently biased again towards the valve body 6, so that the magnetic force of the permanent magnet 7 causes the valve body 6 to rest on the valve seat 10′, so that the fluid intercepting mechanism 1a is changed over to its first stable state (i.e., the passage intercepting state). Such change-over is instantaneously effectuated under a minute current control of the sensor circuit 13. Accordingly, upon extinction of gas flame, the fluid intercepting mechanism is actuated for reliable prevention of gas leakage. This interception is obtained by the first stable state of said fluid intercepting mechanism 1a and reliably maintained unless said manually operating knob 31 is operated again.

Figure 7A:
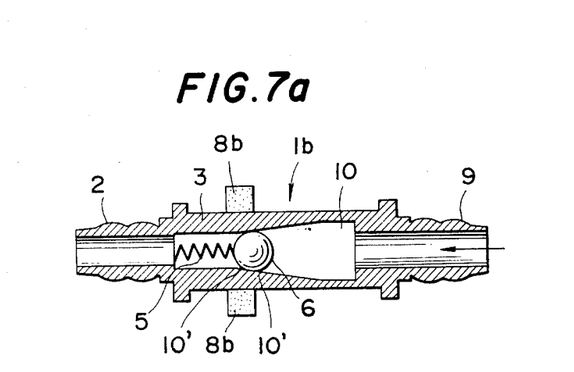
FIGS. 7(a), (b) and 8(a), (b) are sectional views respectively showing the manner in which the other two embodiments of the fluid intercepting mechanism function.

FIGS. 7(a), (b) and 8(a), (b) respectively illustrate other embodiments of the fluid intercepting mechanisms. These fluid intercepting mechanisms 1b, 1c as shown respectively comprise the valve bodies 6 of magnetic material, the resiliently biasing means 5 normally seats 10′ so as to open the passages and the exciting means biasing said valve bodies 6 to be separated from the valves 8b, 8c biasing, when actuated, said valve bodies 6 against the resiliency of said resiliently biasing means 5 to rest on said valve seat 10′ so as to shut the passage off so that these fluid intercepting mechanisms 1b, 1c respectively take their first stable state in which the magnetic force of said exciting means 8b, 8c sufficiently overcomes the resilient force of said resiliently biasing means 5 to force said valve bodies 6 so as to rest on said valve seats 10′ and thereby to shut the passages off and their second stable state in which the resilient force of said resiliently biasing means 5 sufficiently overcomes the magnetic force of said exciting means 8b, 8c to separate said valve bodies 6 from said valve seats 10′ so as to open the passage.

Figure 7B:
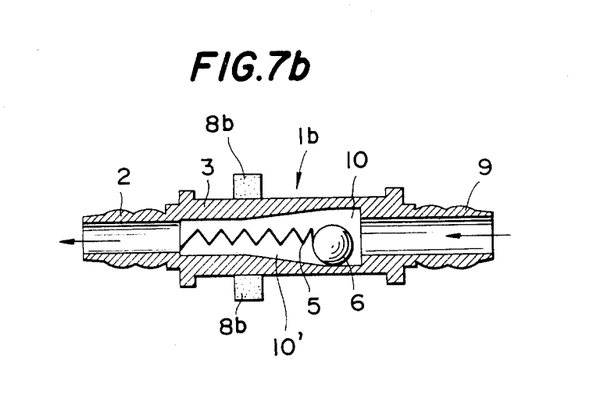
Figure 8A:
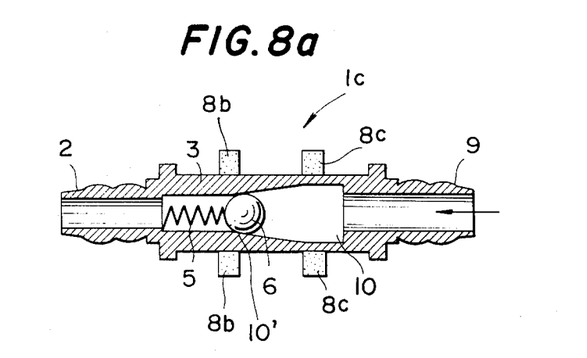

The fluid intercepting mechanism 1b of FIGS. 7(a), (b) include single exciting means 8b stationarily mounted around the outer periphery of the casing 3 while the fluid intercepting mechanism 1c of FIGS. 8(a), (b) include the first exciting means 8b and the second exciting means 8c both stationarily mounted around the outer periphery of the casing 3.

The fluid intercepting mechanism 1b is so constructed that energization of the exciting means 8b causes a magnetic force to be developed in said exciting means 8b, by which magnetic force the valve body 6 of soft magnetic material floating within the valve chest 10 to rest on the valve seat 10′. The fluid intercepting mechanism 1b thereupon takes its first stable state or passage intercepting state (see FIG. 7(a)).

Upon deenergization of the exciting means 8b, said magnetic effect of the exciting means 8b also disappears and the valve body 6 is separated from the valve seat 10′ under the resilient force of the resiliently biasing means 5. Thus, the valve body 6 is maintained again floating within the valve chest 10 and the fluid intercepting mechanism 1b takes again its second stable state or passage opening state (see FIG. 7(b)).

Figure 8B:
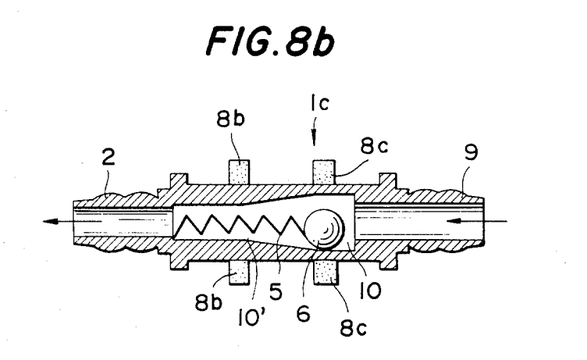

The fluid intercepting mechanism 1c, the third embodiment, is so contructed that energization of the first exciting means 8b causes a magnetic effect attracting the valve body 6 to be developed therein, under which the valve body 6 floating within the valve chest 10 is forced to rest on the valve seat 10′ and, in consequence, the first stable state or passage intercepting state is established (see FIG. 8(a)); and that change-over of energization from the first exciting means 8b to the second exciting means 8c causes a magnetic effect attracting the valve body 6 to be developed therein, under which the valve body 6 is separated from the valve seat 10′ and thereby foats within the valve chest 10 again, establishing the second stable state or passage opening state of the fluid intercepting mechanism 1c (see FIG. 8(b)).

In response to a heat produced during combustion, the thermosensitive luminous medium (N) emits radiation which is then detected by the photo-sensor 12 and the corresponding detection signals are applied through the exciting means 8b, 8c in the same manner as in the case of the exciting means 8a except that, in the case of the fluid intercepting mechanism 1b, there is provided the sensor circuit 13 adaped to energize the exciting means 8b upon extinction of the gas flame (combustion is stopped due to some causes and the photo-sensor 12 detects no radiation), i.e., the magnetic effect is developed in the exciting means 8b only when the photo-sensor 12 is not exposed to the radiation coming from the gas flame.

The fluid intercepting mechanism 1c, the third embodiment, includes the sensor circuit 13 adapted to energize the first exciting means 8b upon extinction of the gas flame (combustion is stopped due to some causes) so that the magnetic effect is developed in the first exciting means 8b, but to energize the second exciting means 8c so long as said photo-sensor 12 detects the radiation and thereby to develop said magnetic effect in the second exciting means 8c.

The manner in which these two embodiments shown by FIGS. 7(a), (b) and 8(a), (b) respectively function may be summarized as following (1) The fluid intercepting mechanism 1b:
the mechanism 1b is held in its second stable state, i.e., the passage opening state (see FIG. 7(b) so far as supply of gas for combustion is steadily maintained, a quantity of gas effusing through the nozzle 44 of the burner head 43 is kept burning and the thermosensitive luminous medium (N) thermosensitively emit radiation which is detected by the photo-sensor 12, and changed over to its first stable state, i.e., the passage blocking state (see FIG. 7(a)) in which, upon disappearance of said radiation from said thermosensitive luminous medium (N), the photo-sensor 12 is actuated to energize the exciting means 8b through the sensor circuit 13 so as to make the valve body 6 block the passage when the gas flame extincts due to some causes (state of gas leakage).

(2) The fluid intercepting mechanism 1c:
the mechanism 1c is held in its second stable state, i.e., the passage opening state (see FIG. 8(b)) in which the second exciting means 8c is energized so far as the gas combustion lasts, and changed over to its first stable state, i.e., the passage blocking state (see FIG. 8(a)) in which the energization is changed over from said second exciting means 8c to the first exciting means 8b when the gas flame disappears due to some causes.

In both embodiments 8b, 8c of the fluid intercepting mechanism, the gas supply can be automatically stopped upon disappearance of the gas flame.

I claim:

1. An automatic fuel supply topping device incorporated in fuel combustion equipment including a shut-off valve and a combustor, the stopping device comprising:

a photo-sensor adapted to detect fuel combustion in the combustor by a radiation emitted from a thermosensitive luminous medium;

a sensor circuit;

a current control circuit associated with the photo-sensor and the sensor circuit, the current control circuit being adapted to output a current when the photo-sensor and the sensor circuit are exposed to the radiation emitted from the thermosensitive luminous medium;

a fluid intercepting mechanism interposed in a channel through which fuel to the combustor is supplied, the fluid intercepting mechanism including a passage, a valve body of magnetic material within the passage, a valve seat in the passage, resilient biasing means normally biasing the valve body to float off the valve seat and thereby open the passage, and a permanent magnet having a magnetic force biasing the valve body against the force of the biasing means to rest on the valve seat and thereby block the passage, the fluid intercepting mechanism assuming a first stable state when the magnetic force of the permanent magnet sufficiently overcomes the force of the resilient biasing means to urge the valve body against the valve seat and thereby block the passage, and a second stable state when the force of the resilient biasing means sufficiently overcomes the magnetic force to float the valve body off the valve seat and thereby open the passage, the change-over from the second stable state to the first stable state being achieved when the permanent magnet is driven by a resilient force of a spring towards the valve body and change-over from the first stable state to the second stable state being achieved when the permanent magnet is driven, under a magnetic force of exciting means produced as the sensor circuit receives the radiation emitted from the thermosensitive luminous medium which energizes the exciting means, away from the valve body against the resilient force of the spring.

* * * * *